(No Model.) 2 Sheets—Sheet 1.
O. O. OZIAS.
PRICE AND WEIGHING SCALE.
No. 527,124. Patented Oct. 9, 1894.
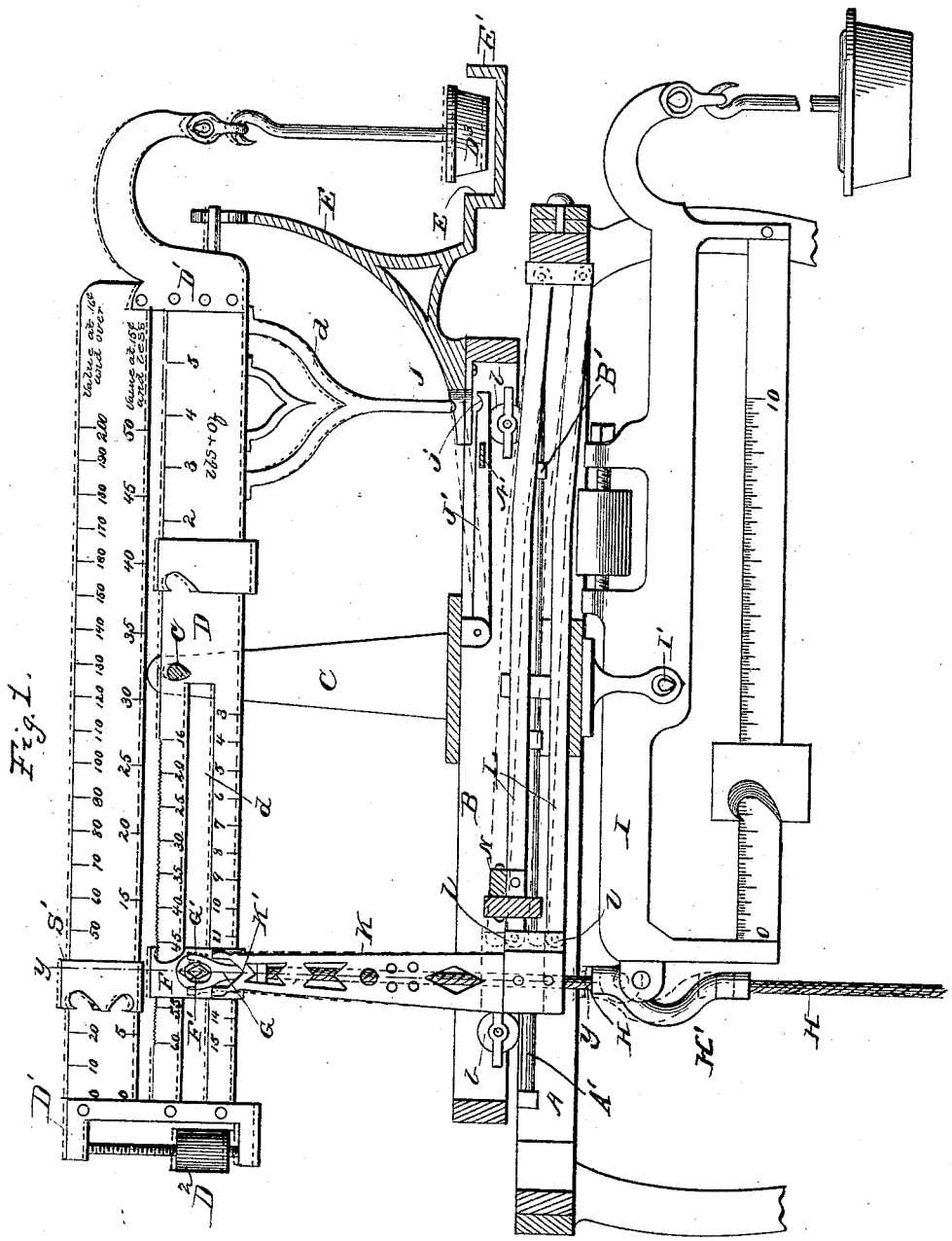
Witnesses
J. M. Fowler Jr.
Alex Stewart
Inventor
Orange O. Ozias,
By Church & Church
his Attorneys (No Model.) 2 Sheets—Sheet 2.
O. O. OZIAS.
PRICE AND WEIGHING SCALE.
No. 527,124. Patented Oct. 9, 1894.
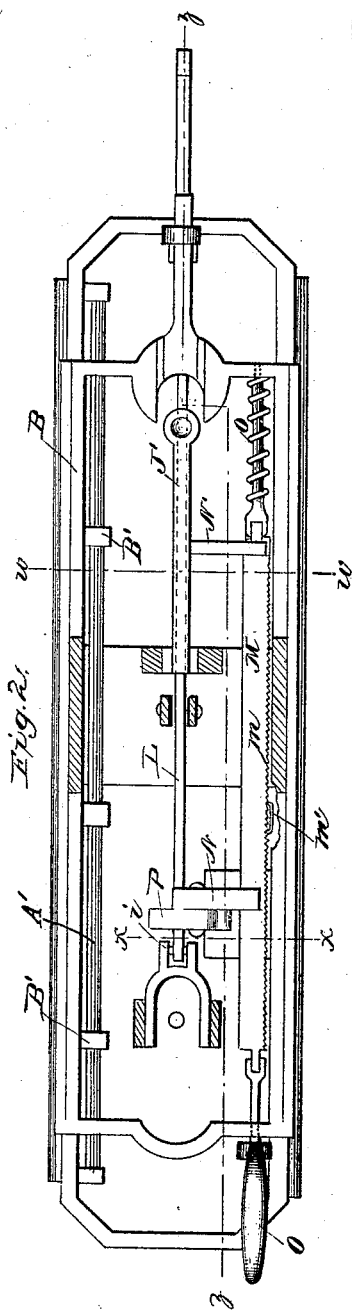
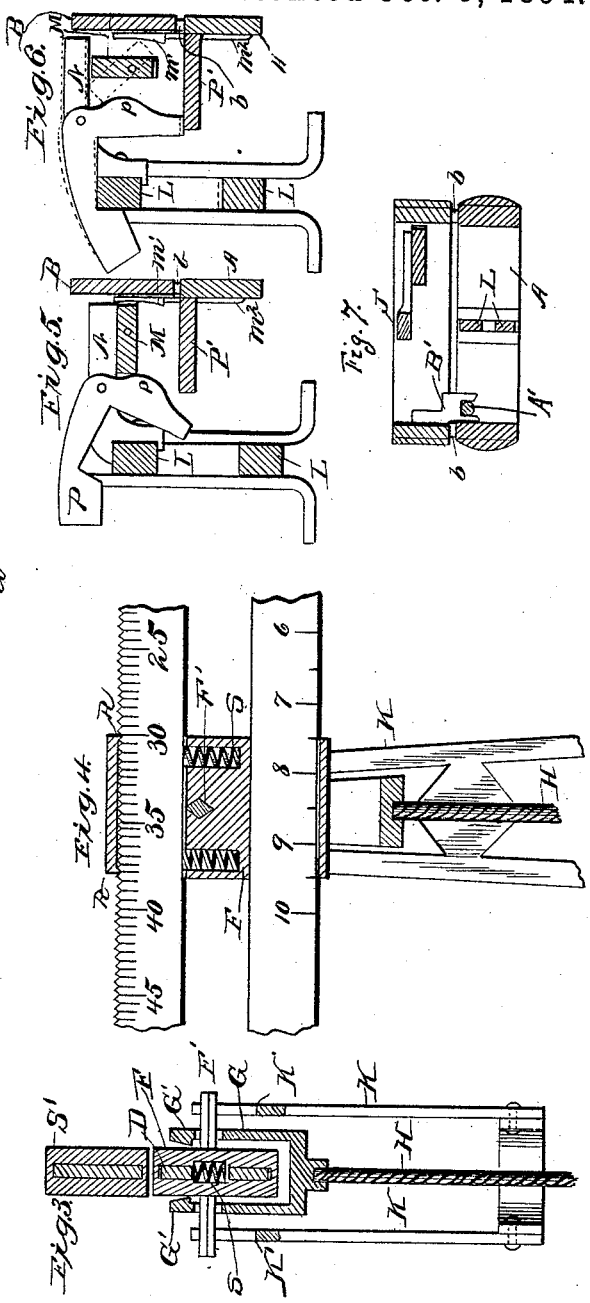
Witnesses.
Inventor
Orange O. Ozias
By Church & Church
his Attorneys.

UNITED STATES PATENT OFFICE.

ORANGE O. OZIAS, OF DAYTON, OHIO.

PRICE AND WEIGHING SCALE.

SPECIFICATION forming part of Letters Patent No. 527,124, dated October 9, 1894.

Application filed April 15, 1893. Serial No. 470,472. (No model.)

*To all whom it may concern:*

Be it known that I, ORANGE O. OZIAS, of Dayton, in the county of Montgomery and State of Ohio, have invented certain new and useful Improvements in Price and Weighing Scales; and I do hereby declare the following to be a full, clear, and exact description of the same, reference being had to the accompanying drawings, forming a part of this specification, and to the letters of reference marked thereon.

This invention relates to improvements in that class of scales now commonly known as computing scales, and which are adapted to give the value of an article at a given price per pound or other unit, which price is varied at the will of the person manipulating the scales, or on the other hand, which may be set to enable a vendor to weigh out the exact quantity of goods for a certain sum at a given price per unit.

The present invention relates particularly, though not exclusively to that particular character of price scales in which a longitudinally movable price beam is employed, and it has for one of its most important objects, to provide a means whereby the parts may be entirely relieved from injurious strains and wear while the beam is being shifted to change the price per unit.

A further object is to provide an improved connection between the platform or equivalent and the price beam which will permit of the connection of an ordinary weighing beam at an intermediate point without affecting in the least the accuracy of the computing mechanism; further objects being to form a connection with the movable beam, which while it may be readily disengaged to shift the beam, cannot be moved accidentally or come to rest except at the exact point desired.

The invention consists in certain novel details of construction and combinations and arrangements of parts all as will be now described and pointed out particularly in the appended claims.

Referring to the accompanying drawings: Figure 1 is a vertical section taken through a scale constructed in accordance with my present invention, portions being shown in elevation to better illustrate the same, and in dotted lines in their secondary position, which position is the one assumed by them when the beam is being shifted. Fig. 2 is a horizontal section taken just above the top of the carriage. Fig. 3 is a vertical section on the line $y$—$y$, Fig. 1. Fig. 4 is a section showing the marking of the units on the beam and the internal construction of the unit price weight or connecting block. Figs. 5 and 6 are detail sections taken on the line $x$—$x$, Fig. 2 and illustrating the action of the elevating and locking cam bar and the supporting pawl for the supporting yoke or stop rest. Fig. 7 is a section on the line $w$—$w$, Fig. 2 showing the means for holding the carriage in alignment and the stop rest for the forward end of the beam with its elevating mechanism.

Like letters of reference in the several figures indicate the same parts.

If reference be had to the patent granted to Sanderson and Ozias on the 28th day of April, 1891, No. 451,075, and to the patent granted me October 17, 1893, No. 506,793, scales will be found illustrated, embodying the essential principles of the present scale and for convenience, in the present case, I have illustrated practically the same form of supplemental base and carriage, the only differences worthy of note being that the supplemental base A is provided with plain smooth ways for the anti-friction wheels $b$ of the carriage B to travel on, and the carriage is kept in alignment by means of a guide rod A' secured to the supplemental base, with which the downwardly projecting yokes B' on the carriage co-operate. The standards C mounted rigidly on the carriage have the usual bearings for the knife edge bar $c$, the latter in this instance passing directly through and connected rigidly with the computing beam D.

The computing beam is formed, in the present instance, of an upper and a lower bar united by clips D' at the ends into a solid and rigid structure, the rear clip serving as a convenient means for supporting the balance weight $D^2$, and the forward clip as a ready means for supporting the pendant $D^3$ for the reception of the additional or supplemental weights.

At the forward end of the carriage, a light casting or frame E is secured, having one arm extended up into position to constitute stops for limiting the movement of the computing beam, and the other extended forward under the pendant D³ and provided with stop shoulders E' for preventing the swinging of the pendant when the carriage is moved in one direction or the other.

The bottom bar of the computing beam is slotted at the rear end and carries a unit price weight or what has heretofore been termed a connecting block F, with a knife edge bar F' passing through it and through the slot in the beam in such position that its upper edge is in alignment with the bottom of the bar $c$ and top of the bar supporting the pendant D³ The bar F' has knife edges at top and bottom and is embraced by bearings G' in the arms of a yoke G carried by the upper end of a flexible connection H, extending down and connected to the platform levers in the usual manner.

At a point beneath the supplemental base, the flexible connection H is provided with a coupling H' for forming the connection with the ordinary weighing beam I.

The object of employing a flexible connection between the beams, will be apparent, when it is remembered that the arcs described by the two beams varies, that is to say, as the upper beam is shifted, the connection occupies different positions with relation to its center of oscillation, and the arc described by the upper end of the connection is, therefore, of necessity different from that described by that part of the connection held by the ordinary weighing beam, and hence if the connection were rigid and stiff, without joints or flexibility, the scale would not operate, or at best would operate inaccurately depending upon the difference in the arcs and the consequent strain thrown on the connection. Obviously, any form of flexible connection may be employed, such as a jointed rod, but I prefer to employ a wire rope, as shown, it only being essential that it have sufficient rigidity to support the weight of the yoke G and the price per unit weight, so that they may be balanced from below and not exert any influence on the computing beam tending to move it in one direction or the other and which would require a counter weight to compensate therefor.

In shifting the carriage and parts carried thereby, back and forth, it is highly desirable that the computing beam shall be held in strictly horizontal position, and with its pivotal knife edges free from the bearings in the standard, so as to prevent wear thereon and to permit the carriage to move freely. It is also of the utmost importance that a locking mechanism shall be provided for the carriage to hold it in exactly the desired position of adjustment, and also that a positive means of connecting the price per unit weight or connecting block and computing beam, shall be provided, so that such parts cannot work out of adjusted position after being once set. To accomplish these important functions, I make use of vertically movable supports or stop rests, the rear one K having V-shaped bearings at the top, adapted to receive and position the knife edge bar F' when it is raised, and through such bar, to support the rear end of the computing beam. At the bottom the sides of the stop rest are joined together and pivotally connected to the forward ends of arms L L located one above the other and pivotally connected to the supplemental base at the rear end at $l\ l$. These two arms being located one above the other keep the stop rest in vertical position throughout its movement, and being very long, cause said rest to move in a practically vertical line. Hence the rear end of the computing beam is lifted vertically, and the correct position of the connecting block is maintained with relation to the flexible connection and weighing beam.

At the forward end, the computing beam is provided with a depending support J, the lower end of which terminates in position to co-operate or rest in a socket $j$ in the end of an arm J' pivotally connected to the under side of the base of the standards C and therefore moving with the carriage in its excursions over the supplemental base and constituting the forward support or stop rest. When these arms J' and L are raised, it will now be seen, that the computing beam will be raised off of its pivotal centers as indicated in dotted lines, and when the carriage is moved, the rear end of said beam will slide easily and smoothly through the connecting block F, preserving accurately its position with relation to the carriage and the connecting block being held rigidly by the rear stop rest, it is obvious that the beam may be set accurately with relation thereto with the greatest facility. In order to raise the arms L and J' simultaneously, they are provided with lateral extensions or supplemental arms lettered N, N' respectively, the ends of which project over a rectangular bar M, which I shall term the "cam bar" journaled in bearings at each end of the carriage Figs. 2, 5 and 6, and provided with an operating handle O at the left hand end, and with a spring $o$ at the opposite end for returning it to normal position, as will be understood by those familiar with the scales before referred to. The bar M is preferably oblong in cross section, and the pivotal centers are arranged slightly to one side of the true longitudinal center of the bar. The projecting side is thus made to operate as a cam and when the bar is turned from the position indicated in Fig. 5, to that indicated in Fig. 6, it will engage the under sides of the lateral supplemental arms or projections N and N' and raise them, together with the arms and supports or stop rests, lifting the computing beam as before described.

It will be understood, that the bar M moves with the carriage, and hence as the carriage moves back and forth, the supplemental arm N would bear on the edge of the bar and create more or less friction, tending to prevent that free and easy movement so necessary to the accurate adjustment of the scale, and in order, to prevent this, a pawl P is pivoted on the side of the said arm N, which when said arm is raised on the corner of the bar M, as shown in dotted lines Fig. 6, drops in by gravity over the projection P' on the frame, and holds the arm in elevated position, leaving the bar M free as indicated in full lines in said figure. A cam surface $p$ on the forward edge of the pawl, is arranged in position to be struck by the forward edge of the bar as the arm is held on the other corner, to throw the pawl forward off of the projection P' as the bar is returned to the position indicated in Fig. 5, in which latter position the cam rests against the edge of the bar ready to gravitate inward as soon as the bar is turned up. The rear end of the pawl is extended and weighted to insure its prompt and proper action.

The carriage is locked and held in locked position by providing the bar M with a serrated or toothed forward edge, as shown clearly in Fig. 2, which serrations or teeth lettered $m$ are adapted to co-operate with corresponding projections $m'$ secured to the supplemental base at $m^2$, whenever the bar is in normal position as indicated in Figs. 2 and 5, and to turn out of engagement therewith when the bar is turned up to the position indicated in Fig. 6 for the purpose of shifting the carriage along.

The operation of the invention, as so far described, will be readily understood, for when the operator desires to change the price per unit, he simply grasps the handle O, turns it down to the front, which act raises and holds the computing beam, through the medium of the arms and bar before described, then with the handle pressed down, he pushes the carriage in the direction it should be moved, and when the price per unit weight or connecting block arrives at the proper point, the handle is released and returns to normal position under the influence of its spring.

It is very essential in these scales that the connecting block or price per unit weight, should be capable of being located with great certainty and should be held absolutely without danger of working in one direction or the other when the beam is moved, or when subjected to the rough handling that scales of this kind are apt to receive in use, and at the same time, the beam must be capable of moving easily and smoothly through the weight or block when the carriage is shifted to set the price per unit. To accomplish this, the top of the bar with which said weight or block engages is notched to correspond to the indications or divisions of the beam, and the weight or block has teeth at each side as at R, adapted to fit down in such notches at the same time. Thus should one side of the weight be raised the tooth at the opposite side will hold and vice versa, it being practically impossible to release the weight without lifting it straight up as is done by the stop rest.

In Fig. 4 an enlarged section of the lower bar of the beam is shown together with a vertical section of the weight or connecting block, and from this figure it will be seen, that springs S are located within the weight, in position to bear against the under side of the bar to assist in holding the teeth in engagement. The under side of the bar forms a smooth bearing and hence when the block is raised the bar slides readily through the same. The teeth or serrations on the beam should correspond to the teeth or serrations on the bar M so that the carriage will lock at exactly the point where the teeth on the weight will drop vertically into the proper teeth on the beam.

With a view to shortening up the beam, and at the same time, allowing a wide range of marking, the price weight S' and the price per unit weight or connecting block are each adapted to register with two sets of marks, the set of higher denomination, having marks indicating multiples of the corresponding mark in the set of lower denomination. In the present scales the ratio is four to one. In carrying this idea into practice, in the most practicable manner, the lower bar of the beam is provided with a lower series of marks beginning with a low mark, say the figure 3, near the fulcrum, and running up to say 15 near the rear end, such marks being spaced widely apart and therefore enable the connecting block to be set with the greatest accuracy. Then, starting at a point near the center or fulcrum, an upper series of marks is formed, the first one of which begins directly over the mark in the lower series of which it is a multiple. Thus as shown, 16 which is the next indication above the highest mark in the lower series, is located directly over the 4 mark of such lower series. The upper series is much more finely divided than the lower series and the multiple ratio is preserved throughout. Thus the upper set terminates with the 60 mark directly over the 15 mark. The upper bar of the beam is also provided with two series or sets of marks which are adapted to be read in connection with the upper or lower set on the lower bar as the case may be, that is to say, when the reading is taken from the upper or lower set of one bar it must be taken from the corresponding set of the other bar. In marking the upper bar, however both the series or sets, start from the rear end of the beam and both begin with the minimum or 0 mark, enabling a reading to be taken of the price for any quantity, no matter how small at any price per unit, indicated on either set of the lower bar. The upper set on the upper bar however has the indications arranged very much closer together, and bears exactly the same relation to the lower set on that bar as described with relation to the lower bar. As shown the lower set runs from 0 up to 50, and the upper set runs from 0 up to 200, this latter mark being located directly over the 50 mark of which it is a multiple.

Having thus described my invention, what I claim as new is—

1. In a computing scale, the combination with the longitudinally movable computing beam, of a stop rest for supporting said beam at each end, with means for elevating and depressing said rests, whereby the beam may be supported in horizontal position while being moved; substantially as described.

2. In a computing scale, the combination with the longitudinally movable computing beam, and a connector extending from the platform to the beam and adjustably connected therewith, of a support for holding said connector while the beam is being shifted and a support for the forward end of the beam, with means for elevating said supports into operative position; substantially as described.

3. In a computing scale, the combination with the longitudinally movable computing beam and the connector for the platform, adjustably connected therewith, of the support for the connector held against longitudinal movement with the beam, and the support for the forward end of the beam, movable longitudinally therewith and means for moving said supports into operative position; substantially as described.

4. In a computing scale, the combination with the base, the carriage movable longitudinally thereon and the computing beam fulcrumed on the carriage, of the support for the rear end of the beam carried by the base, and the support for the forward end of the beam carried by the carriage with means for moving said supports into operative position; substantially as described.

5. In a computing scale, the combination with the base, the carriage movable longitudinally thereon, the computing beam fulcrumed on the carriage, and the connector for the platform adjustably connected with the beam, of an arm pivotally connected with the base, a support or stop rest for said connector connected to and guided in its vertical movements by the said pivoted arm and mechanism for raising the support into operative position; substantially as described.

6. In a computing scale, the combination with the base, the carriage movable longitudinally thereon, the computing beam fulcrumed on the carriage and the connector for the platform adjustably connected with the beam, of the support or stop rest for said connector and the arms arranged in a vertical plane and pivotally connecting the said support and the base, whereby the support is maintained in vertical position; substantially as described.

7. In a computing scale, the combination with the base the carriage movable longitudinally thereon, the computing beam fulcrumed on the carriage, the connector for the platform adjustably connected with the beam and the support or stop rest for said connector, of the arms pivotally connecting said stop rest and base and the arm pivotally connected with the carriage for supporting the forward end of the beam, with means for raising said arms into operative position; substantially as described.

8. In a computing scale, the combination with the base, the carriage movable longitudinally thereon, the computing beam fulcrumed on the carriage and the connector for the platform, adjustably connected with the rear end of the beam, of the stop rest for the connector and rear end of the beam, the arms pivotally uniting the said stop rest and the base and the cam bar journaled on the carriage and cooperating with the stop rest to raise the same into operative position; substantially as described.

9. In a computing scale, the combination with the base, the carriage movable longitudinally thereon, the computing beam fulcrumed on the carriage, the connector for the platform adjustably connected with the rear end of the beam, the stop rest for the connector and the rear end of the beam, pivotally connected with the base, and the support for the forward end of the beam connected to and moving with the carriage, of the cam bar journaled in the carriage and cooperating with said stop rest and support to move the same into operative position; substantially as described.

10. In a computing beam, the combination with the base, the longitudinally movable computing beam and the support for the end of the beam, of the cam bar movable with the beam for elevating the support, and the pawl for holding the support elevated, moved into and out of operative position by the cam bar; substantially as described.

11. In a computing scale, the combination with the base the longitudinally movable computing beam, the support for the end of the beam pivotally connected with the base, and the cam bar movable with the beam for moving said support into operative position, of the pawl for holding the support in operative position moved into and out of operative position by the cam bar; substantially as described.

12. In a computing scale, the combination with the base, the longitudinally movable computing beam, the support for the end of the beam, the pivotal arms connecting the support and base, the lateral projection on said arms and the cam bar cooperating with said lateral projection to move the support into operative position; substantially as described.

13. In a computing scale, the combination with the base, the longitudinally movable computing beam and the toothed cam bar movable longitudinally with the beam, of the stationary projections on the base for cooperation with the teeth on the cam bar to hold the beam in adjusted position; substantially as described.

14. In a computing scale, the combination with the base, the longitudinally movable carriage and the computing beam fulcrumed thereon, of the toothed cam bar journaled in the carriage and movable longitudinally therewith, and the stationary projections secured on the base for cooperation with the teeth on the bar to hold the carriage in adjusted position, with means for turning said bar to disengage the teeth; substantially as described.

15. In a computing scale, the combination with the base, the longitudinally movable carriage and the computing beam fulcrumed thereon, of the stop rest for the end of the beam, the pivotal arm carrying said stop rest having the lateral projection, the pawl pivotally connected to the said lateral projection and adapted to rest on the base to support said rest in operative position and the cam lever journaled in the carriage and cooperating with the lateral projection to raise the stop rest, and cooperating with the pawl to move the same away from the base when the stop rest is lowered, substantially as described.

16. In a computing scale, the combination with the base and the weighing beam fulcrumed thereon, of the longitudinally movable computing beam and the flexible connection extending from the computing beam to the weighing beam, whereby binding is prevented when the arcs described by the beams do not coincide; substantially as described.

17. In a computing scale, the combination with the base and the weighing beam fulcrumed thereon, and the longitudinally movable computing beam, of a flexible connection for the attachment of the platform, extending past and connected with the weighing beam and adjustably connected with the computing beam, whereby binding is prevented when the arcs described by the beams do not coincide; substantially as described.

18. In a computing scale, the combination with the base, the longitudinally movable computing beam having the bar on the rear end notched on the upper side and the support for the forward end of the beam, of the price per unit weight or connecting block sliding on the notched end of the beam, and having teeth for cooperation with the notches therein, and a bearing for the under side of the bar and a movable support for said weight or connecting block with means for moving said support whereby the block is lifted to disengage the teeth and, together with the support for the forward end, to support the beam in horizontal position to permit of its independent longitudinal movement; substantially as described.

19. In a computing scale, the combination with the longitudinally movable graduated computing beam notched to correspond to one set of graduations, and a connecting block for the platform connections cooperating with the notched beam, of a support for holding said connector while the beam is being shifted, and supports for opposite ends of the beam while being moved, with means for throwing said supports into operative position and disengaging the connecting block from the toothed surface while the bar is being moved: substantially as described.

ORANGE O. OZIAS.

Witnesses:
W. W. HAMILTON,
C. W. DUSTIN.